July 25, 1967   J. E. MOWERY   3,333,186
APPARATUS HAVING A PLURALITY OF PAIRS OF IMPEDANCE ELEMENTS
FOR TESTING ELECTRICAL WIRING CONNECTIONS
Filed Aug. 14, 1964
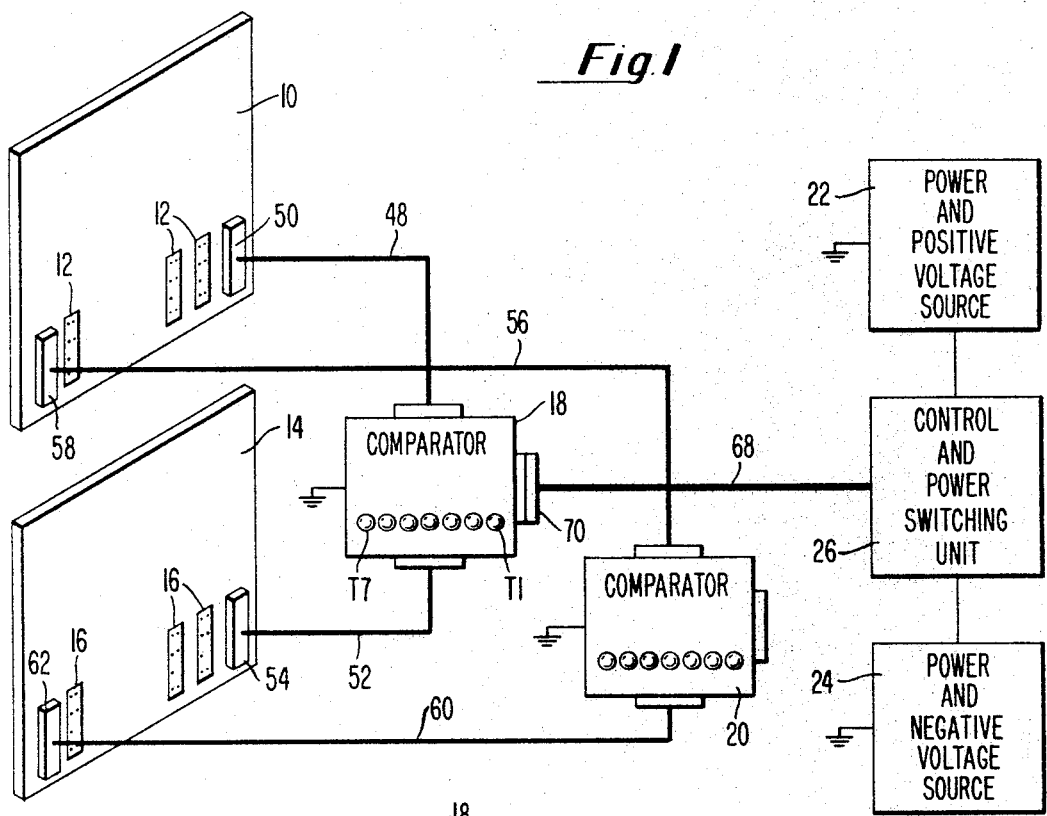
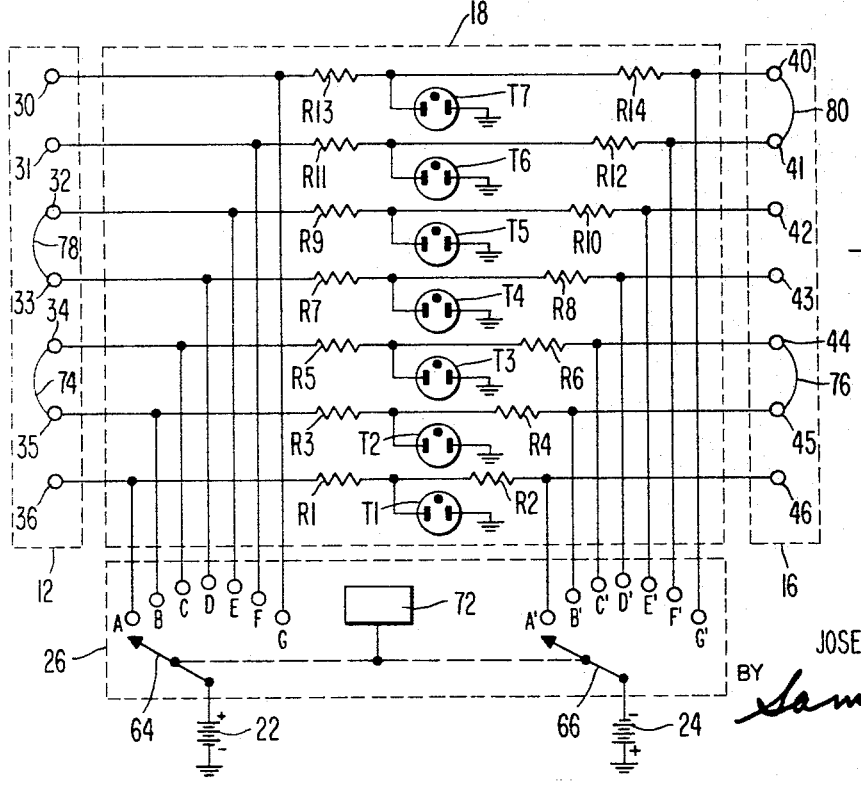
INVENTOR.
JOSEPH E. MOWERY
BY *Samuel Kane*
ATTORNEY

United States Patent Office 3,333,186
Patented July 25, 1967

3,333,186
APPARATUS HAVING A PLURALITY OF PAIRS OF IMPEDANCE ELEMENTS FOR TESTING ELECTRICAL WIRING CONNECTIONS
Joseph E. Mowery, Glen Riddle, Pa., assignor to Burroughs Corporation, Detroit, Mich., a corporation of Michigan
Filed Aug. 14, 1964, Ser. No. 389,635
11 Claims. (Cl. 324—51)

This invention relates generally to electrical testing devices and more particularly to apparatus for testing the accuracy of wiring connections between terminals of a multi-terminal network. While not limited thereto, the invention finds special utility for checking the accuracy of wiring connections between terminals of back-boards and therefore the invention will be described hereinafter in connection with such use.

The present method for checking the accuracy of back-board wiring connections is to check for continuity between terminals on the back-board which, according to a wire list, should be electrically continuous. This method of checking has certain disadvantages. First, it is time consuming. Secondly, the check is not complete in that it does not check for open circuits between terminals which should be open-circuited. Third, the human factor involved in the check can cause errors in the check itself, and fourth, the check assumes that the wire list is accurate when, in fact, it may not be.

An object of the present invention is to provide a testing apparatus which will overcome the above-stated disadvantages.

Another object of the invention is to provide a testing apparatus for reliably checking the accuracy of wiring connections between terminals of a multiterminal network.

A further object of the invention is to provide a testing apparatus which makes it possible to check for open circuits as well as for short circuits.

Another object of the invention is to provide a testing apparatus which will indicate whether a faulty connection is caused by an open circuit or a short circuit.

A further object of the invention is to provide a testing apparatus which will indicate between which specific terminals of a network a connection fault exists.

Another object of the invention is to provide a testing apparatus which can be adapted for checking different back-boards.

Another object of the invention is to provide a testing apparatus which can readily be expanded from an existing capacity to accommodate larger-scale wiring systems.

A further object of the invention is to provide a testing apparatus whereby a single test of a wiring system will result in each terminal connection being checked twice, once from each end.

Another object of the invention is to provide a testing apparatus for comparing the terminal wiring connections of a multiterminal test network with those of a master or standard network of known accuracy.

Still a further object of the invention is to provide a testing apparatus which is simple to use, inexpensive to manufacture, and which reduces the time required for testing to a minimum.

In accordance with the above objects and considered first in its broader aspects, the invention may include a plurality of impedance elements, means for connecting certain ones of the impedance elements individually to the terminals of a test network, means for connecting the other impedance elements individually to the corresponding terminals of a master network, means for supplying a potential of one polarity to a terminal under test of the test network for energizing a first impedance element which is connected to that terminal, means for supplying a potential of the opposite polarity to the corresponding terminal of the master network for energizing a second impedance element which is connected to that terminal, and means responsive to the energization of a third impedance element by one of the energizing potentials, caused by a connection fault of the terminal under test, for indicating that the wiring connection status of the terminal under test does not conform with that of the corresponding terminal of the master network.

The invention will be more clearly understood when the following detailed description of the preferred embodiment thereof is read in conjunction with the accompanying drawings in which:

FIG. 1 is a diagrammatic view of a testing apparatus constructed in accordance with the invention; and FIG. 2 is a schematic diagram of the interwiring of electrical components and connections of some of the elements of FIG. 1.

Turning now to the detailed description of the illustrated embodiment of the invention, and first with reference to FIG. 1 of the drawings, a test back-board 10 is provided with a plurality of multiterminal connectors 12 each of whose terminals may, for example, be of the socket-type and which may be interconnected with each other and with terminals of other connectors 12 by means of wiring or other circuit elements, in a particular circuit configuration. A standard or master back-board 14 is provided with a corresponding number of multiterminal connectors 16 each of which corresponds to a connector 12 and whose terminal wiring connections are known to be accurate.

For comparing the wiring connections of the connectors 12 on the test back-board 10 with the wiring connections of the connectors 16 on the master back-board 14 there are provided one or more comparators, two of which, comparators 18 and 20, are illustrated in FIG. 1. As will appear more clearly hereinafter, while only one comparator may be used and successively plugged into the various connectors 12 and 16, this method will only provide a test of the terminals on a particular connector 12 with respect to each other, but will not test their connection status with respect to any other terminal on any other connector 12. Therefore, it is preferable that there be at least two comparators so that the terminals on a connector 12 will also be tested with respect to the terminals on at least one other connector 12. It is still more preferable that there be one comparator for each connector 12 so that each time the terminals of a connector 12 are tested, their connection status will also be determined relative to every other terminal on every other connector 12 on the test back-board 10.

The wiring connections of the terminals of a particular connector 12 on the test back-board 10 are compared with the wiring connections of the terminals of the corresponding connector 16 on the master back-board 14 by sequentially applying a voltage of one polarity to each terminal on the test connector 12 and a voltage of the opposite polarity to each corresponding terminal on the master connector 16, and by monitoring every other terminal on each of the back-boards, as will be explained. These voltages are obtained from sources 22 and 24 and are applied to the terminals whose connections are being compared through the particular comparator which is connected to the connector under test by means of a control and power switching unit 26.

FIG. 2 is a schematic diagram of some of the elements shown in FIG. 1 and illustrates how electrical connection is established between the comparator 18, a connector 12 under test, its corresponding master connector 16 and the control and power switching unit 26.

Each of the connectors 12 is provided with a plurality of terminals, and these are indicated on the connector 12 under test in FIG. 2 by the numerals 30–36. The master connector 16 in FIG. 2 is accordingly shown with a corresponding number of terminals 40–46, respectively.

Each comparator is provided with a number of monitoring circuits, one for each of the terminals of the associated connector 12. Thus the comparator 18 is provided with seven monitoring circuits, one for each of the terminals 30–36. Each monitoring circuit includes a plurality of impedance elements of equal ohmic value and a fault indicating means. In the present embodiment, the impedance elements of the several monitoring circuits are represented as resistors R1–R14, and the several fault indicating means are illustrated in one form as electric discharge lamps or neon glow tubes T1–T7. Thus the terminal 30, for example, on the test connector 12 and its corresponding terminal 40 on the master connector 16 are associated with and have connected between them a monitoring circuit which includes the pair of resistors R13 and R14 and the fault indicating glow tube T7 which is coupled to the junction of these resistors.

Electrical connection is established, as shown, between the resistors R1, R3, R5, R7, R9, R11 and R13 and the test terminals 30–36 by means of a cable 48 (FIG. 1) and its terminating multiterminal connector plug 50 which is plugged into the particular connector 12. Similarly, electrical connection is established, as shown, between the resistors R2, R4, R6, R8, R10, R12 and R14 and the terminals 40–46 on the master connector 16 by means of a cable 52 (FIG. 1) and its terminating multiterminal connector plug 54 which is plugged into the corresponding master connector 16. Every other comparator is similarly connected at all times during a test to a connector 12 on the test back-board 10 and to its corresponding connector 16 on the master back-board 14. Thus, for example, the monitoring circuits of the comparator 20 are connected to a connector 12 and its corresponding master connector 16 by means of a cable 56 and its terminating multiterminal connector plug 58 which is plugged into the connector 12, and by means of a cable 60 and its terminating multiterminal connector plug 62 which is plugged into the corresponding master connector 16. It is noted that while all comparators are plugged in at all times during testing of all the connectors 12, power is applied from the potential or voltage sources 22 and 24 to only one comparator at a time, as indicated in FIG. 1, and as will appear more clearly hereinafter.

The voltage sources 22 and 24 (FIG. 2) have equal voltage values. Electrical connection is established during testing between these voltage sources and the test terminals 30–36 and corresponding master terminals 40–46 by means of the control and power switching unit 26 which is illustrated in this embodiment in FIG. 2 in one of its forms as a stepping switch. The stepping switch 26 is provided with a first bank of contacts A–G, each adapted to be electrically connected, as shown, to one of the test terminals 30–36 and a second bank of contacts A'–G', each adapted to be electrically connected, as shown, to one of the master terminals 40–46. The stepping switch 26 is further provided with electrically conductive wipers 64 and 66, coupled together or otherwise adapted to be moved simultaneously for applying power from the potential sources 22 and 24 sequentially to the contacts A–G and A'–G', respectively. One end of the wiper 64 is connected to the positive terminal of the potential source 22 and one end of the wiper 66 is connected to the negative terminal of the potential source 24. The control and power switching unit or stepping switch 26 is provided with a cable 68 (FIG. 1) and its terminating multiterminal connector plug 70 for plugging in and applying the stepping switch 26 to the various comparators in succession.

A testing operation for testing the accuracy of wiring connections of the terminals 30–36 is initiated by actuating the stepping switch 26 manually, or by power or automatically if desired as by means of a device indicated diagrammatically by the block 72 (FIG. 2), for simultaneously stepping the wipers 64 and 66 into contact with the contacts A and A', respectively. A circuit will thus be established and will include the potential source 22, the wiper 64, contact A, resistor R1, resistor R2, contact A', wiper 66, and the potential source 24. Since the resistors R1 and R2 are of equal ohmic value and since the potential sources 22 and 24 are also of equal voltage value, the voltages applied therefrom will divide equally across the resistors R1 and R2 so that no voltage will appear across the glow tube T1. Consequently, the glow tube T1 will not be energized and this condition will indicate that the wiring connection status of the terminal 36 under test conforms with that of the corresponding terminal 46 on the master connector 16. In other words, in this illustration both terminals 36 and 46 have the same wiring connection status since they both are not connected to any terminal.

The wipers 64 and 66 are next stepped to make contact simultaneously with the contacts B and B' to thereby apply the potential from source 22 to the terminal 35 under test and the potential from source 24 to the corresponding master terminal 45. Since terminal 35 is illustratively connected to terminal 34 by means of a conductor 74, and since terminal 45, corresponding to terminal 35, is similarly connected to terminal 44, corresponding to terminal 34, by means of a conductor 76, the glow tubes T2 and T3 will not be energized since in this case also the voltages across resistors R3 and R4 and across resistors R5 and R6 will similarly divide equally. Thus the wiring connection of test terminal 35 to test terminal 34 is shown to conform with the wiring connection between the corresponding master terminals 45 and 44.

The stepping switch 26 is again actuated to advance the wipers 64 and 66 simultaneously into contact with the contacts C and C', respectively, to obtain a test of the terminal 34. In this case also, the glow tubes T2 and T3 will not be energized since the status of connection of the test terminal 34 is the same as the corresponding terminal 44 on the master connector 16. Since terminal 34 is connected to terminal 35 by means of the conductor 74, it will be apparent that each of these terminals is tested twice, once from each end.

The wipers 64 and 66 are again advanced, as previously, to make contact with the contacts D and D', respectively, to test the connection status of the terminal 33 on the test connector 12. An inspection of the corresponding disconnected terminal 43 on the master connector 16 indicates that terminal 33 should similarly be disconnected. However, terminal 33 is illustrated as being connected to terminal 32 by means of a conductor 78, which may represent an erroneous connection or a short circuit. In this case, a circuit will be established which will include the potential source 22, wiper 64, contact D, terminal 33, conductor 78, terminal 32, resistor R9, and glow tube T5. Thus a voltage will appear across the glow tube T5 and will cause one of its electrodes to glow, thereby indicating that a connection fault exists between the terminals 33 and 32. The particular electrode which glows will indicate that the connection fault is a closed-circuit fault. A circuit will also be established which will include the potential source 22, wiper 64, contact D, resistor R7, resistor R8, contact D', wiper 66 and the potential source 24. In this latter circuit, however, voltages across the resistors R7 and R8 will be equal and therefore no voltage will appear across the glow tube T4.

The stepping switch 26 is again actuated to advance the wipers 64 and 66 to contact the contacts E and E', respectively, to apply the test to the terminal 32. In this case no voltage will appear across the glow tube T5 but a voltage will appear across the glow tube T4. This voltage is established in a circuit which includes the potential source 22, wiper 64, contact E, terminal 32, conductor 78, terminal 33, resistor R7, and the glow tube T4. Thus the appropriate electrode of the glow tube T4 will glow and this will indicate again that the connection fault is a closed-circuit fault between the terminals 32 and 33.

The wipers 64 and 66 are next advanced to contact the contacts F and F', respectively, to apply the test to the disconnected terminal 31. An inspection of the master connector 16 reveals that the corresponding terminal 41 is illustratively connected to a terminal 40 by means of a conductor 80, and therefore that terminal 31 should also be connected to terminal 30. In this case, a circuit will be established which will include the potential source 24, wiper 66, contact F', terminal 41, conductor 80, terminal 40, resistor R14 and glow tube T7. Thus, the appropriate electrode of the glow tube T7 will glow and this will indicate that the connection fault of the terminal 31 under test is an open-circuit fault between the terminals 31 and 30. When the wipers 64 and 66 are finally stepped to contact the contacts G and G' to test the terminal 30, the open-circuit connection fault of the terminal 30, which is similar to that of the terminal 31, will again be indicated to be between the terminals 30 and 31 when the appropriate electrode of the glow tube T6 glows. In this case, the circuit in which the glow tube T6 is energized will include the potential source 24, wiper 66, contact G', terminal 40, conductor 80, terminal 41, resistor R12, and the glow tube T6.

The foregoing description of the testing operation was directed specifically to the circuit shown in FIG. 2, and to the status of wiring connections between the terminals 30–36 of the test connector 12 with respect to each other. However, as mentioned earlier, it is preferable to have a comparator for each connector 12 on the test backboard 10 and to have each comparator connected at all times with its associated connector 12 and with the corresponding connector 16 on the master back-board 14. In such case, a test as described above will also indicate the wiring connection status of each terminal 30–36 relative to every other terminal to which it may or may not be connected of every other connector 12 whose associated comparator is plugged in. It is understood that if a connection fault should exist between one of the terminals 30–36 and a terminal of another connector 12, that the appropriate glow tube of the comparator which is plugged into the other connector will be energized, and will indicate the nature and location of the fault.

In order to apply the test to all the connectors 12, the plug 70 (FIG. 1) terminating the cable 68 is withdrawn from the comparator 18 and then plugged into the other comparators, in succession, and the test repeated, as described previously, in each case.

While there has been shown and described a specific apparatus constructed in accordance with the invention, it is to be understood that this is but one embodiment thereof and that the invention is capable of being constructed in a variety of shapes, sizes, and modifications without departing from the true scope and spirit thereof. Accordingly, it is to be understood that the invention is not to be limited by the specific apparatus disclosed but only by the subjoined claims.

What is claimed is:

1. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, first means for supplying a potential of one polarity to a terminal under test of the test network for energizing a first impedance element which is connected to that terminal, second means for supplying a potential of the opposite polarity to the corresponding terminal of the master network for energizing a second impedance element which is connected to that terminal, said first and second potential supplying means being connected in series, and means responsive to the energization of a third impedance element of another pair by one of said energizing potentials, caused by a connection fault of the terminal under test which places said third impedance element in circuit with said one of said energizing potentials, for indicating nonconformity.

2. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, the impedance elements which are connected to corresponding terminals of the test network and master network having the same impedance, first means for supplying a potential of one polarity to a terminal under test of the test network for energizing a first impedance element which is connected to that terminal, second means for supplying a potential of the opposite polarity to the corresponding terminal of the master network for energizing a second impedance element which is connected to that terminal, said first and second potential supplying means being connected in series, and means responsive to the energization of a third impedance element of another pair by one of said energizing potentials, caused by a connection fault of the terminal under test which places said third impedance element in circuit with said one of said energizing potentials, for indicating nonconformity.

3. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, first means for supplying a first potential of one polarity to a terminal under test of the test network for energizing a first impedance element which is connected to that terminal, second means for supplying a second potential of equal voltage value and of the opposite polarity to the corresponding terminal of the master network for energizing a second impedance element which is connected to that terminal, said first and second potential supplying means being connected in series, and means responsive to the energization of a third impedance element of another pair by one of said energizing potentials, caused by a connection fault of the terminal under test which places said third impedance element in circuit with said one of said energizing potentials, for indicating nonconformity.

4. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, first means for supplying a potential of one polarity to a terminal under test of the test network for energizing a first impedance element which is connected to that terminal, second means for supplying a potential of the opposite polarity to the corresponding terminal of the master network for energizing a second impedance element which is connected to that terminal, said first and second potential supplying means being connected in series, and an electric discharge device responsive to the energization of a third impedance element of another pair by one of said energizing potentials, caused by a connection fault of the terminal under test which places said third impedance element in circuit with said one of said energizing potentials, for indicating nonconformity.

5. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, a first source of potential of one polarity for energizing a first impedance element which is connected to a terminal under test of the test network, a second source of potential of the opposite polarity for energizing a second impedance element which is connected to the corresponding terminal of the master network, said first and second sources of potential being connected in series, means responsive to the energization of a third impedance element of another pair by one of said energizing potentials, caused by a connection fault of the terminal under test which places said third impedance element in circuit with said one of said energizing potentials, for indicating nonconformity, and switching means for sequentially applying the first potential source to individual terminals of the test network and simultaneously sequentially applying the second potential source to the corresponding terminals of the master network.

6. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, the impedance elements which are connected to corresponding terminals of the test network and master network having the same impedance, a first source of potential of one polarity for energizing a first impedance element which is connected to a terminal under test of the test network, a second source of potential of the opposite polarity for energizing a second impedance element which is connected to the corresponding terminal of the master network, said first and second sources of potential being connected in series, means responsive to the energization of a third impedance element of another pair by one of said energizing potentials, caused by a connection fault of the terminal under test which places said third impedance element in circuit with said one of said energizing potentials, for indicating nonconformity, and switching means for sequentially applying the first potential source to individual terminals of the test network and simultaneously sequentially applying the second potential source to the corresponding terminals of the master network.

7. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, a first source of potential of one polarity for energizing a first impedance element which is connected to a terminal under test of the test network, a second source of potential of equal voltage value and of the opposite polarity for energizing a second impedance element which is connected to the corresponding terminal of the master network, said first and second sources of potential being connected in series, means responsive to the energization of a third impedance element of another pair by one of said energizing potentials, caused by a connection fault of the terminal under test which places said third impedance element in circuit with said one of said energizing potentials, for indicating nonconformity, and switching means for sequentially applying the first potential source to individual terminals of the test network and simultaneously sequentially applying the second potential source to the corresponding terminals of the master network.

8. Apparatus for testing the conformity of connections between terminals of a multiterminal test network with connections between corresponding terminals of a master network comprising, a plurality of pairs of impedance elements each pair being interconnected, means for connecting one of the impedance elements of each pair individually to the terminals of the test network, means for connecting the other impedance element of each pair individually to the corresponding terminals of the master network, a first source of potential of one polarity for energizing a first impedance element which is connected to a terminal under test of the test network, a second source of potential of the opposite polarity for energizing a second impedance element which is connected to the corresponding terminal of the master network, said first and second sources of potential being connected in series, an electric discharge device responsive to the energization of a third impedance element of another pair by one of said energizing potentials, caused by a connection fault of the terminal under test which places said third impedance element in circuit with said one of said energizing potentials, for indicating nonconformity, and switching means for sequentially applying the first potential source to individual terminals of the test network and simultaneously sequentially applying the second potential source to the corresponding terminals of the master network.

9. Apparatus for detecting connection faults between terminals of a multiterminal test network comprising, a standard network having corresponding interconnected terminals, a plurality of pairs of impedance elements each pair being interconnected, means for connecting one of the impedance elements of each pair individually to the terminals of the test network, means for connecting the other impedance element of each pair individually to the corresponding terminals of the standard network, first means for supplying a first potential of one polarity to a terminal under test of the test network for energizing a first impedance element which is connected to that terminal, second means for supplying a potential of the same voltage value as the first potential but of opposite polarity to the corresponding terminal of the standard network for energizing a second impedance element which is connected to that terminal, said first and second potential supplying means being connected in series, and means responsive to the energization of a third impedance element of another pair by one of said energizing potentials, caused by a connection fault of the terminal under test which places said third impedance element in circuit with said one of said energizing potentials, for indicating the existence of the fault and whether the fault is caused by an open circuit or a closed circuit.

10. Apparatus for detecting connection faults between terminals of a multiterminal test network comprising, a standard network having corresponding interconnected terminals, a plurality of pairs of resistors each pair being interconnected, means for connecting one of the resistors of each pair individually to the terminals of the test network, means for connecting the other resistor of each pair individually to the corresponding terminals of the standard network, the resistors which are connected to corresponding terminals of the test network and master network having the same resistance, first means for supplying a first potential of one polarity to a terminal under test of the test network for energizing a first resistor which is connected to that terminal, second means for supplying a potential of the same voltage value as the first potential but of opposite polarity to the corresponding terminal of the standard network for energizing a second resistor which is connected to that terminal, said first and second potential supplying means being connected in series, and an electric discharge device responsive to the energization of a third resistor of another pair of one of said energizing potentials, caused by a connection fault of the terminal under test which places said third resistor in circuit with said one of said energizing potentials, for indicating the location of the fault.

11. Apparatus for detecting connection faults between terminals of a multiterminal test network comprising, a standard network having corresponding interconnected terminals, a plurality of pairs of resistors each pair being interconnected, the resistors of each pair having the same resistance, means for connecting one of the resistors of each pair of resistors individually to the terminals of the test network, means for connecting the other resistor of each pair of resistors individually to the corresponding terminals of the standard network, first means for supplying a first potential of one polarity to a terminal under test of the test network for energizing the resistor which is connected to that terminal, second means for supplying a potential of the same voltage value as the first potential but of opposite polarity to the corresponding terminal of the standard network for energizing the resistor which is connected to that terminal, said first and second potential supplying means being connected in series, and a glow lamp responsive to the energization of a resistor of another pair of resistors by one of said energizing potentials, caused by a connection fault of the terminal under test which places said resistor of another pair of resistors in circuit with said one of said energizing potentials, for visibly indicating the location of the fault and whether the fault is caused by an open circuit or a closed circuit.

References Cited
UNITED STATES PATENTS

| | | | |
|---|---|---|---|
| 1,298,710 | 4/1919 | Hess | 340—256 |
| 2,243,259 | 5/1941 | Pierce | 324—52 |
| 2,456,499 | 12/1948 | Fritzinger | 324—54 X |
| 2,823,350 | 2/1958 | Macleish | 324—52 |
| 2,869,076 | 1/1959 | Evans et al. | 324—51 |
| 3,182,253 | 5/1965 | Dorsch et al. | 324—66 X |

WALTER L. CARLSON, *Primary Examiner.*

G. R. STRECKER, *Assistant Examiner.*